(12) United States Patent
Neil et al.

(10) Patent No.: US 8,269,881 B2
(45) Date of Patent: Sep. 18, 2012

(54) ADAPTIVE IMAGE PROCESSING AND CAPTURE

(75) Inventors: Mark Andrew Aquilla Neil, Oxford (GB); Paul Michael William French, London (GB)

(73) Assignee: Imperial Innovations Limited, London (GB)

( * ) Notice: Subject to any disclaimer, the term of this patent is extended or adjusted under 35 U.S.C. 154(b) by 287 days.

(21) Appl. No.: 11/579,490

(22) PCT Filed: May 10, 2005

(86) PCT No.: PCT/GB2005/001775
§ 371 (c)(1), (2), (4) Date: Mar. 20, 2007

(87) PCT Pub. No.: WO2005/120044
PCT Pub. Date: Dec. 15, 2005

(65) Prior Publication Data
US 2007/0273784 A1 Nov. 29, 2007

(30) Foreign Application Priority Data
Jun. 1, 2004 (GB) .................................. 0412197.6

(51) Int. Cl.
*H04N 5/235* (2006.01)
*H04N 9/083* (2006.01)
*H04N 5/225* (2006.01)

(52) U.S. Cl. .................. 348/362; 348/207.99; 348/289; 348/291

(58) Field of Classification Search .......... 348/289–291, 348/335, 207.99
See application file for complete search history.

(56) References Cited

U.S. PATENT DOCUMENTS

| | | | | |
|---|---|---|---|---|
| 5,212,555 A * | 5/1993 | Stoltz | | 348/203 |
| 5,995,145 A | 11/1999 | Viliesid | | |
| 6,069,352 A | 5/2000 | Castracane et al. | | |
| 6,130,731 A * | 10/2000 | Andersson et al. | | 349/77 |
| 6,268,884 B1 * | 7/2001 | Yagi et al. | | 348/252 |
| 6,674,474 B2 | 1/2004 | Hatae et al. | | |

(Continued)

FOREIGN PATENT DOCUMENTS
GB    2255465 A    4/1992
(Continued)

OTHER PUBLICATIONS

International Search Report for PCT/GB2005/001775 mailed Jul. 25, 2005.

(Continued)

*Primary Examiner* — John Villecco
*Assistant Examiner* — Selam Gebriel
(74) *Attorney, Agent, or Firm* — Woodcock Washburn LLP

(57) ABSTRACT

An imaging apparatus comprising: A spatial light modulator (30) operable to receive incident light (34) representing an incident light image and to intensity modulate said incident light to form spatially modulated (38) light; and an image capture device (42) operable to receive said spatially modulated light and to detect an intensity value for different portions of said spatially modulated light to form a modulated light image therefrom; wherein said spatial light modulator attenuates different parts of said incident light by different proportions such that intensity values of said incident light image are given by a combination of intensity values of said modulated light image captured by said image capture device and data representing proportions of attenuation applied to corresponding parts of said incident light image by said spatial light modulator.

19 Claims, 7 Drawing Sheets

U.S. PATENT DOCUMENTS

| | | |
|---|---|---|
| 2003/0020827 A1 | 1/2003 | Bean et al. |
| 2003/0122955 A1 | 7/2003 | Neidrich |
| 2011/0211077 A1* | 9/2011 | Nayar et al. ............... 348/207.1 |

FOREIGN PATENT DOCUMENTS

| | | |
|---|---|---|
| JP | 63-033977 A | 2/1988 |
| JP | 519178 A | 7/1993 |
| JP | 2002-204391 A | 7/2002 |
| WO | WO 00/79784 | 12/2000 |
| WO | 03-014796 A | 2/2003 |
| WO | WO 2005/120044 | 12/2005 |

OTHER PUBLICATIONS

S. K. Nayar et al., "Adaptive dynamic range imaging: optical control of pixel exposures over space and time", IEEE International Conference on Computer Vision, vol. 2, (2003).

International Preliminary Report on Patentability issued Dec. 4, 2006 in corresponding International Application No. PCT/GB2005/01775.

European Patent Office Examination Report issued Mar. 5, 2010 in corresponding European Application No. 05 742 205.5.

Goodman, et al., "Fourier Transforming Proerties of Lenses," Introduction to Fourier Optics, McGraw-Hill, San Francisco, Jan. 1, 1996, pp. 101-106.

Japanese Patent Office Notice on Reasons for Refusal issued Apr. 13, 2010 in corresponding Japanese Application No. 2007-514068.

* cited by examiner

ADAPTIVE IMAGE PROCESSING AND CAPTURE

CROSS-REFERENCE

This application claims priority to PCT/GB2005/001775 filed 10 May 2005, which claims priority to GB 0412197.6, filed 1 Jun. 2004, the entire contents of each which are hereby incorporated by reference.

BACKGROUND

This invention relates to an imaging apparatus and method.

Many wide-field imaging devices currently exist, such as charge-coupled-device (CCD) cameras and image intensifiers. Many such imaging devices have controllable settings that can be used to improve the quality of a resulting output image. These settings allow the imaging device to be used with a wide range of types of incident image. One such setting is the "gain" of the imaging device, which acts as an intensity multiplier and may be used to help distinguish between incident intensities of a similar value, thus exposing detail. Another device setting is the "exposure time" or "integration time", which controls the time period over which incident light contributes to the resulting image. The settings of gain and exposure are particularly useful when capturing images of faint or dark objects.

BRIEF DESCRIPTION OF THE DRAWINGS

Embodiments of the invention will now be described, by way of example only, with reference to the accompanying drawings in which.

DETAILED DESCRIPTION

Figure 1:
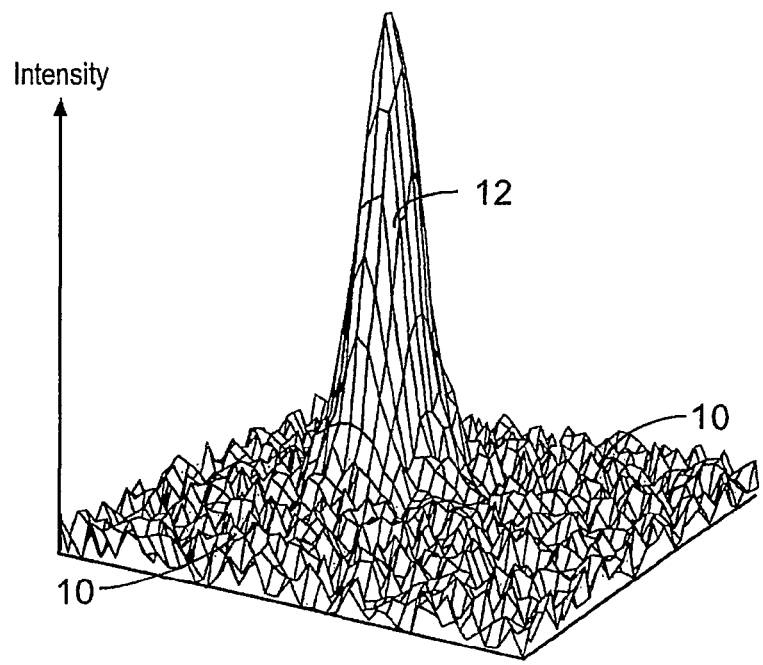
FIG. 1 is an example plot of light intensities for an incident image that is to be captured by an imaging device.
Figure 2:
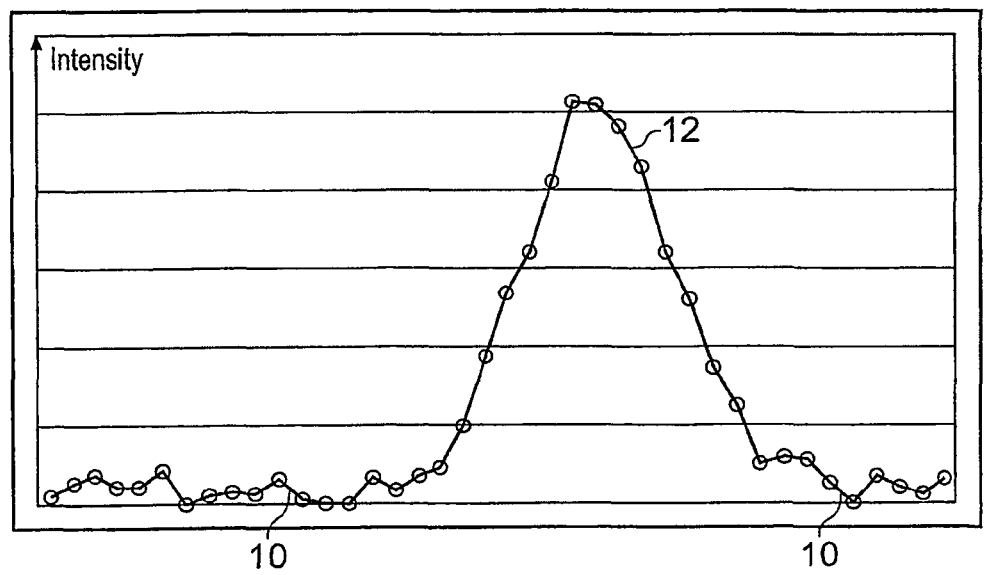
FIG. 2 is an example cross-section through the plot of FIG. 1.

FIG. 1 of the accompanying drawings is an example plot of light intensities for an incident image that is to be captured by an imaging device, such as a CCD camera. The incident image has a wide range of intensity values. The majority of the intensity samples 10 are of a relatively low intensity value, representing relatively dark areas. However, there is an area of intensity samples 12 representing incident light of a high intensity level. FIG. 2 of the accompanying drawings is an example cross-section through the plot of FIG. 1.

Figure 3:
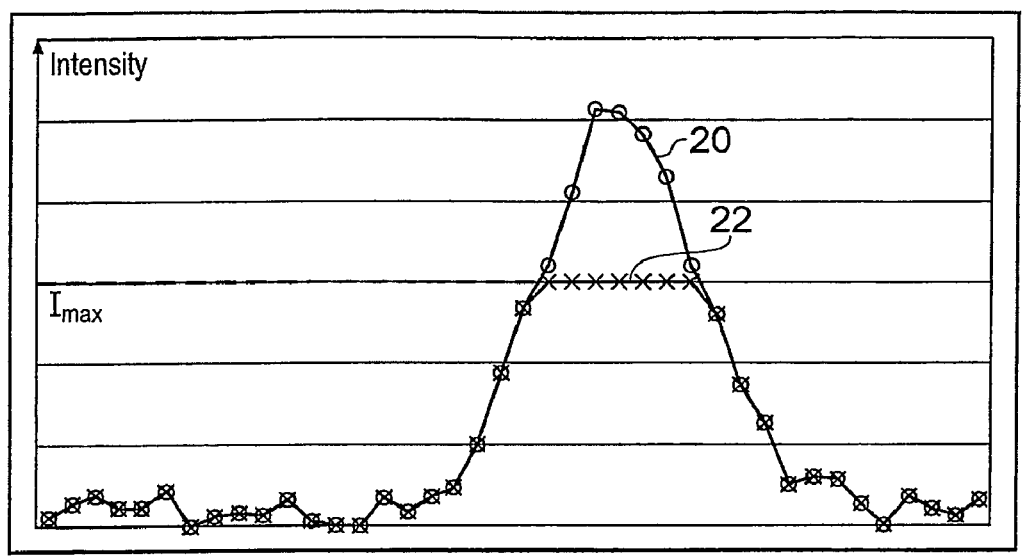
FIG. 3 an example plot of intensity values when saturation occurs.

Problems can arise when the incident image has both dark areas of low light intensity and bright areas of high light intensity, as shown in FIG. 1. If the integration time of the, imaging device is too long, it is possible for it to become saturated, i.e. for the area of high light intensity 12, the imaging device loses its (linear) responsiveness to the incident light and the intensity samples values associated with the area of high light intensity 12 assume a maximal value. FIG. 3 of the accompanying drawings is an example plot of intensity values when saturation occurs. The line 20 is a plot of the (integrated) intensity of the light incident on the imaging device over the exposure period. The value $I_{max}$ is the maximum (integrated) intensity value that the imaging device can faithfully record. The line 22 therefore represents the resultant captured incident light (integrated) intensity, with (integrated) intensity values constrained to being at most $I_{max}$, causing a loss of detail.

Further problems can occur when the integration time is set to be too long. For some imaging devices, such as CCD cameras, an effect known as "blooming" may occur in which, once a saturation level has been reached for some of the sampled intensity values, erroneously high values are given to samples surrounding the area of saturation.

Figure 4:
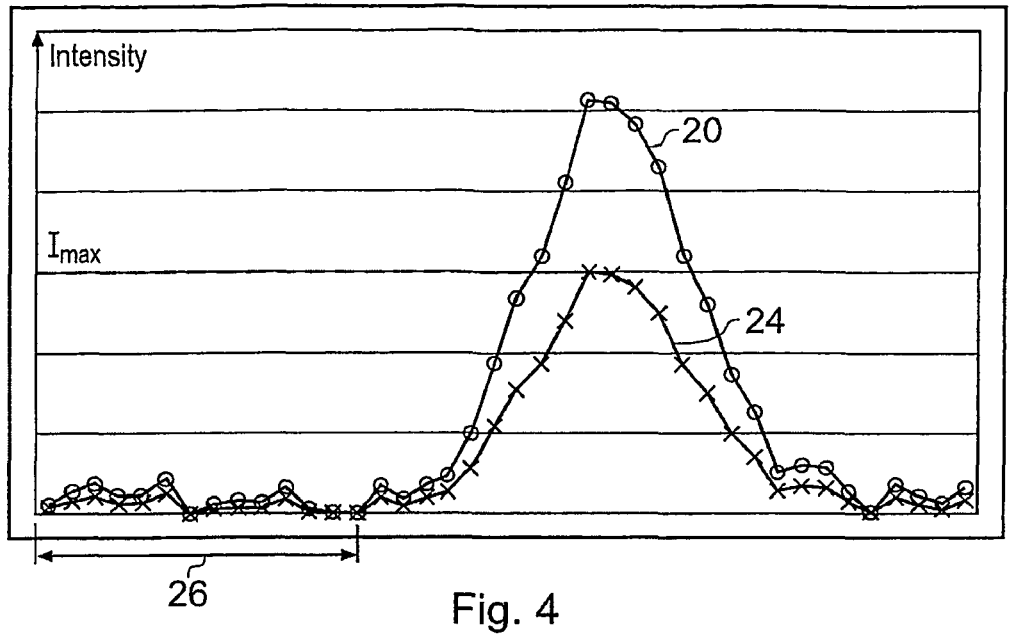
FIG. 4 is an example plot of intensity values similar to those of FIG. 3, but in which the integration time has been reduced.

It is therefore important to ensure that the integration time of the imaging device is correctly set, dependent on the incident light image. FIG. 4 of the accompanying drawings is an example plot of (integrated) intensity values similar to those of FIG. 3, but in which the integration time has been reduced. The line 24 represents the (integrated) intensity values captured by the imaging device over the reduced integration period. As the integration time has been reduced, the maximum captured (integrated) intensity is now close to the maximum possible captured (integrated) intensity, $I_{max}$.

FIG. 4 also represents an example plot of (integrated) intensity values when the imaging device makes use of a controllable gain setting, the gain setting acting as an intensity multiplier. Instead of adjusting the integration time, the gain setting can be adjusted to reduce the captured (integrated) intensity values, resulting in captured (integrated) intensity values according to the line 24.

Figure 5:
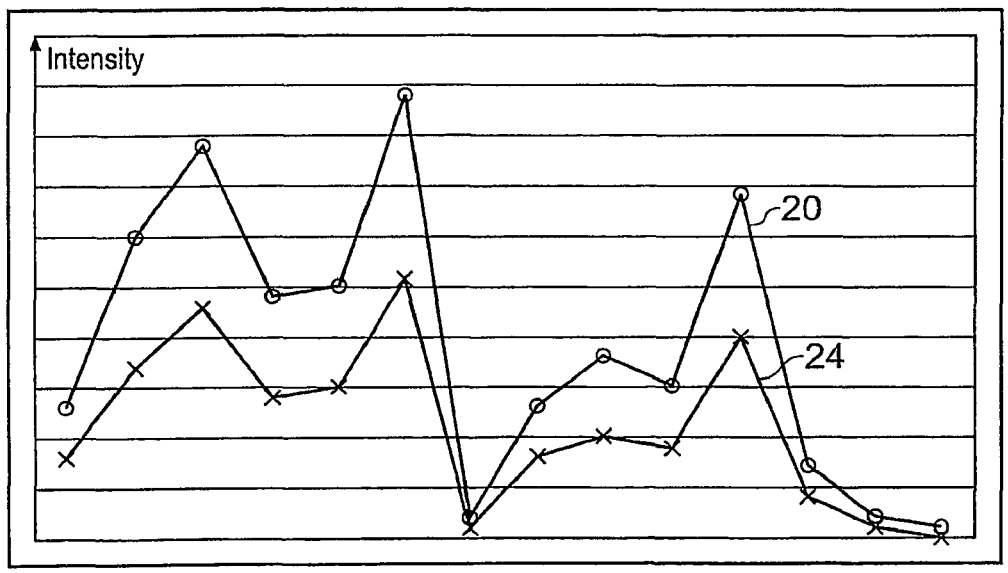
FIG. 5 is a close-up plot of the intensity values from a range of intensity values from FIG. 4.

Whilst reducing the integration time or the gain setting of the imaging device is useful for faithfully capturing areas of the incident image that have high intensity values, such adjustments can have a negative impact on the capture of areas of the incident image that have low intensity values. FIG. 5 of the accompanying drawings is a close-up plot of the intensity values from a range 26 of intensity values from FIG. 4, the range 26 corresponding to a less bright section of the incident image with low (integrated) intensity values. The signal level of the (integrated) intensity of the incident light 20 is much larger than the signal level of the intensity of the captured light 24 when the imaging device has been set to use a reduced integration time or a reduced gain setting. This may result in a significant loss of detail. For example, if the captured intensities are digitised, then the effective number of bits being used to describe the area of low intensity is less than would be used if a longer integration time or higher gain setting had been selected for the imaging device. Further, the low level signals may be swamped by noise such that the intensity information is degraded.

There is therefore a difficulty with capturing incident images that have areas of both high and low light intensity. Adjusting the gain setting or integration time of the imaging device to accommodate high light intensities can have an adverse effect on the quality/resolution of captured intensities corresponding to the areas of low light intensity.

The ability of an imaging detector to faithfully record information of both high intensity and low intensity signals within an image is described by its dynamic range.

This problem of limited dynamic range can be exacerbated when a series of electronic recorded images is to be processed to produce a final image. Invariably, processing a series of images will further reduce the dynamic range of the final image, as intensities often need to be normalised to account for variations across the series of images. This can occur, for example, in fluorescence lifetime imaging, in which fluorescent molecules, such as marker dyes, are used to identify areas with certain characteristics and optical imaging techniques are used to produce maps of the localisation of the fluorophore over time.

Another problem resulting from the limited dynamic range can occur during processing in which, for example, the background is to be removed from the image. It may be the case that the background has a larger magnitude than the regions of interest. Consequently, when the background is removed, the resulting image has a dynamic range that is a small fraction of the dynamic range of the original imaging device.

A known approach to solving this problem is to use imaging devices with as large a dynamic range as possible, thereby allowing bright areas to be reproduced whilst at the same time allowing the faint or dark areas to be reproduced with sufficient detail. CCD cameras typically are limited to a pixel bit-depth of 16 bits. In general, imaging devices of higher dynamic range are more expensive and are slower.

There is, therefore, a need for an imaging system that can reproduce, with sufficient dynamic range, an incident image that has a wide range of intensity values, such as an image in which faint or dark objects are close to bright objects.

According to one aspect this invention provides an imaging apparatus comprising:

a spatial light modulator operable to receive incident light representing an incident light image and to intensity modulate said incident light to form modulated light; and an image capture device operable to receive said spatially modulated light and to detect an intensity value for different portions of said modulated light to form a modulated light image therefrom; wherein said spatial light modulator attenuates different parts of said incident light by different proportions such that intensity values of said incident light image are given by a combination of intensity values of said modulated light image captured by said image capture device and data representing proportions of attenuation applied to corresponding parts of said incident light image by said light modulator.

The invention recognises that by intensity modulating an incident image into a modulated image of reduced dynamic range, an imaging device of a lower dynamic range may be used to record the image. This allows the use of cheaper and faster imaging devices of lower dynamic range. The dynamic range of the light modulator effectively augments the dynamic range of the image capture device. Settings used during the modulation process may be recorded for later interpretation of the captured image.

In preferred embodiments, the spatial light modulator is used to produce modulated light that has a reduced range of intensity values in comparison to the range of intensity values of the incident light. Such embodiments allow an image capture device with a dynamic range less than the range of intensity values of the incident light to be used to capture the modulated light. As capture devices, such as CCD cameras, with a large dynamic range are both expensive and slow, embodiments of the invention that make use of a light modulator in this way are both cheaper and faster than an imaging apparatus that uses an image capture device with a dynamic range large enough to faithfully capture the full range of the un-modulated incident light.

Furthermore, whilst embodiments of the invention may use light modulators to produce modulated light with an arbitrary dynamic range of intensity values, preferred embodiments of the invention use light modulators to produce modulated light with a, dynamic range of intensity values that matches the dynamic range of the capture device. In doing so, the capture device is used to greatest effect. If the range of intensity values of the modulated light is less than the dynamic range of the capture device, then bandwidth associated with the captured image is wasted and the captured image may be less detailed than would otherwise have been possible. If the range of intensity values of the modulated light is greater than the dynamic range of the capture device, then it is possible that the same problem of being able to faithfully capture an image that has a large range of intensity values still exists.

Further preferred embodiments of the invention comprise a feedback controller responsive to the intensity values of the modulated light image captured by the image capture device and operable to control the attenuation effected by the light modulator. The feedback controller provides additional advantage in that it is able to control how the light modulator attenuates different parts of the incident light image in dependence upon the incident light image. It is therefore able to control the light modulator in an attempt to produce a modulated light image that is most suitable for the image capture device. For example, the feedback controller may control the light modulator so that the dynamic range of intensity values of the modulated light matches the dynamic range of the image capture device. The feedback controller is operable to control the light modulator on a per-image basis, thereby allowing the imaging apparatus to adapt appropriately for any given incident light.

In preferred embodiments, the image capture device is a 2-dimensional array detector such as a CCD may or a CMOS detector array. For imaging with coherent light preferred embodiments include (a) a single or few channel detector such as a photodiode or a photo multiplier tube, or (b) a two photon detector, employed to sample an optical signal that indicates the degree to which the incident light intensity distribution is uniform. Preferred coherent imaging embodiments would utilize a single or few channel one-photon detector behind an aperture or a two-photon (intensity-dependent) detector located in a Fourier plane of the spatially modulated light image. The use of the single or few channel detector providing feedback to the modulator such that it produces a uniform output image opens the possibility of being able to detect wavelengths not normally possible in wide field imaging, for example at wavelengths for which only single or few channel detectors are available.

Viewed from another aspect the invention provides a method of imaging comprising the steps of:

receiving incident light representing an incident light image;

intensity spatially modulating said incident light to form modulated light;

capturing said modulated light; and detecting an intensity value for different portions of said captured modulated light to form a modulated light image therefrom; wherein said intensity spatial modulation attenuates different parts of said incident light by different proportions such that intensity values of said incident light image are given by a combination of intensity values of said captured modulated light image and data representing proportions of attenuation applied to corresponding parts of said incident light image.

Figure 6:
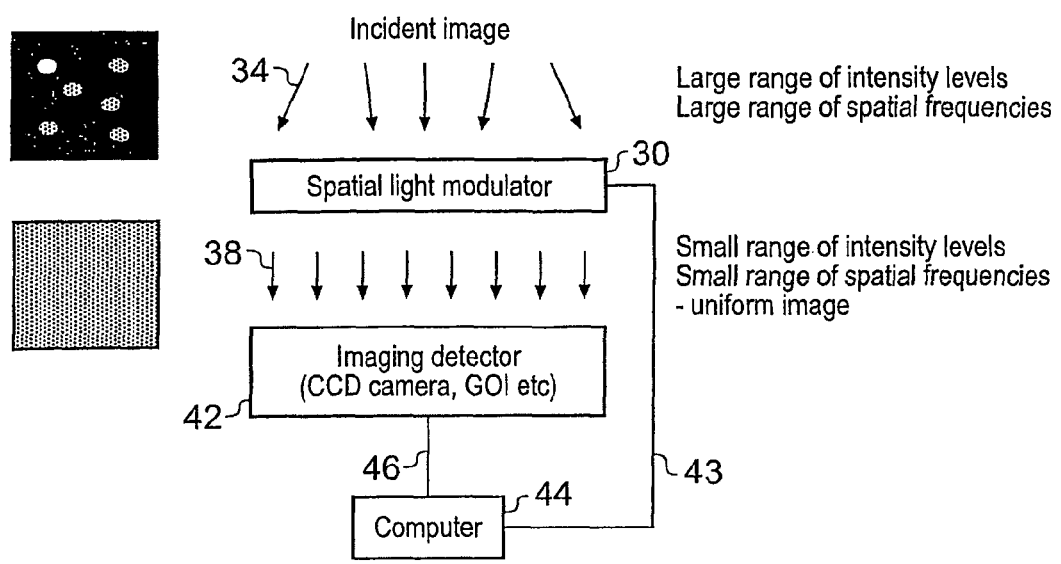
FIG. 6 schematically illustrates a capture device connected to a light modulator.

FIG. 6 schematically illustrates a capture device 42 arranged to receive light from a spatial light modulator (SLM) 30. The SLM 30 receives incident light 34, modulates this (reduces in intensity) and outputs modulated light 38. Essentially (some of) the burden of dynamic range is transferred from the capture device 42 to the SLM 30. One example application might be imaging in a building on fire. There are also many biomedical applications, such as fluorescence imaging when there is more than one fluorescent species in the field of view and one species fluoresces much more brightly than another. Specific applications include spectrally-resolved imaging and fluorescence lifetime imaging, for which there is a minimum dynamic range requirement to permit accurate fitting of the recorded fluorescence profiles. This is extremely challenging when one fluorescent species may be weak while another is saturating the imaging detector.

It will be appreciated that many different types of light modulator exist and may be used with the capture device 42. In this example embodiment, an SLM 30 is being used. SLMs are well known in this field of technology and shall not be described in great detail here. In brief though, the SLM 30 is operable to modulate a value of incident light intensity in dependence on the spatial location of the incident light sample in the incident image. For example, the SLM 30 may be configured to modulate the left half of the incident light 34 to a greater extent than the right half of the incident light 34. The SLM 30 is also able to selectively modulate light on a pixel-by-pixel basis.

Figure 7:
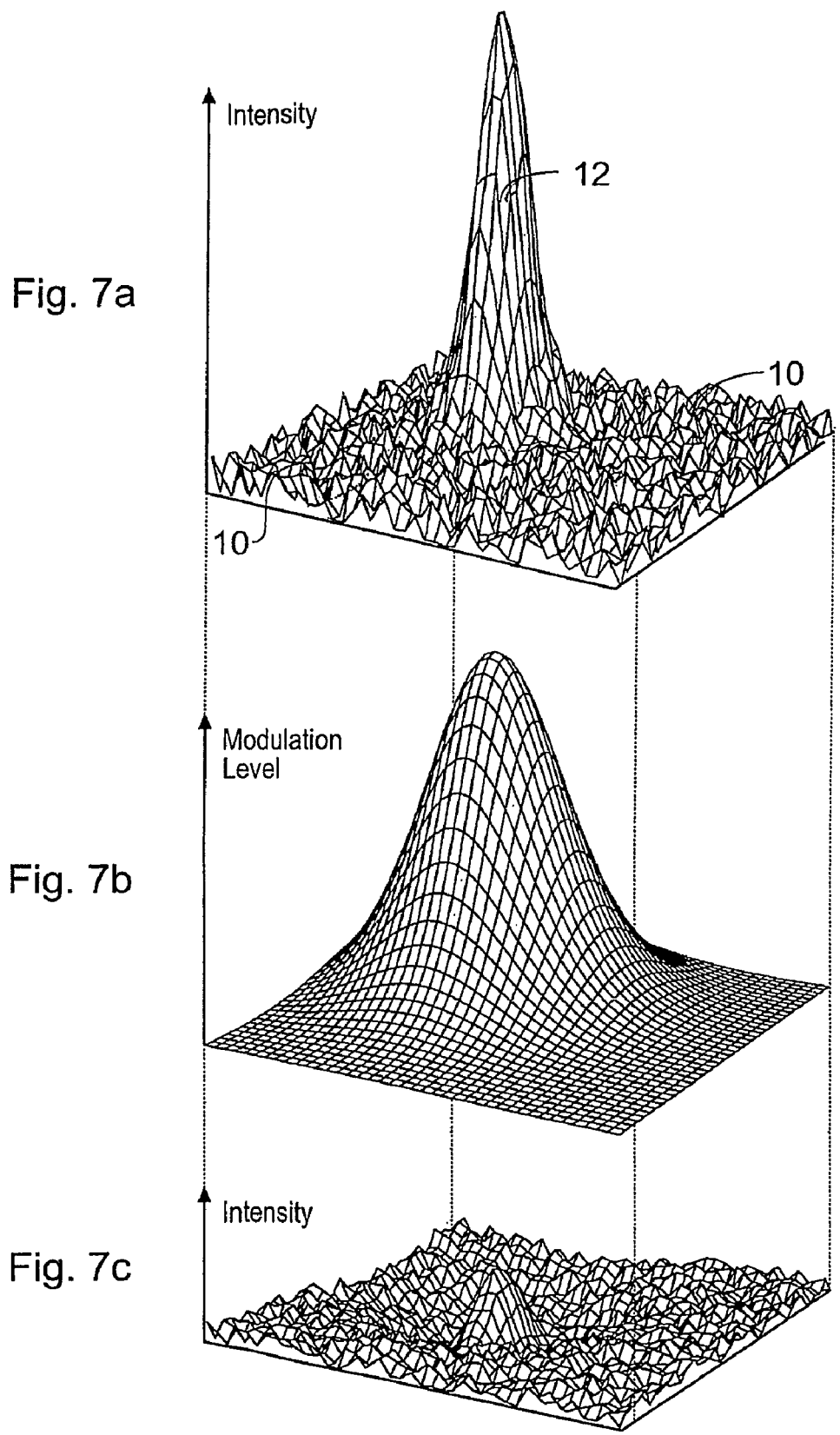
FIG. 7 is an example plot of how incident light can be modulated by a spatial light modulator.

FIG. 7 is an example plot of how the incident light 34 can be modulated by the SLM 30. The plot 7a is the same plot of intensity values of an incident image as in FIG. 1. As in FIG. 1, there are areas 10 in the incident image of low intensity value and there is an area 12 in the incident image of high intensity value.

The plot 7b is a plot of the degree of modulation that is to be applied by the SLM 30. Note that the SLM 30 has been set to apply a higher level of modulation to the area 12 of higher incident light intensity. However, the modulation level does not necessarily exactly match the incident light intensities and it is possible for a low intensity level to be modulated to a greater extent than a higher intensity level as the modulation level is dependent on a spatial position.

With the modulation level of the SLM 30 set according to the plot 7b, the intensity levels of the modulated light 38 are illustrated in the plot 7c. As can be seen, the dynamic range of the modulated light 38 is considerable lower than the dynamic range of the incident light 34.

The SLM 30 can therefore be set to produce modulated light 38 of a lower dynamic range than the incident light 34, thereby allowing a capture device 42 of reduced dynamic range to be used. Such capture devices 42 of reduced dynamic range are, in general, cheaper and faster than similar devices of higher dynamic range. Naturally, in order to interpret the captured modulated light, it is necessary to know the degree of modulation applied to the incident light 34. The SLM 30 therefore has its own inherent dynamic range and the arrangement of FIG. 6 can be viewed as transferring some of the dynamic range "burden" from the capture device 42 to the SLM 30. For example, a 32 bit captured image could correspond to 16 bits of dynamic range from the capture device 42 and 16 bits of dynamic range from the SLM 30.

It is preferable if the dynamic range of the modulated light 38 matches the dynamic range of the capture device 42. If the SLM 30 modulates the incident light 34 too much, then the dynamic range of the capture device 42 is not being used to its greatest effect. However, if the SLM 30 does not modulate the incident light 34 sufficiently, then it is possible that the capture device 42 will still have difficulty in faithfully capturing an incident image with a wide range of intensity levels.

Also illustrated in FIG. 6 is a feedback channel 43. The capture device 42 is connected to a computer 44 via a connection 46. The computer 44 analyses the modulated light 38 captured by the capture device 42 and sends a control signal to the SLM 30 via the feedback channel 43. The computer 44 operates to improve the resultant captured image by adjusting how the SLM 30 modulates the incident light 34. These adjustments aim to create modulated light 38 that is best suited to the capture device 42. The computer 44 could, for example, iteratively control the modulation applied by the SLM 30 until the dynamic range of the intensity values of the modulated light 38 matches the dynamic range of the capture device 42.

Figure 8:
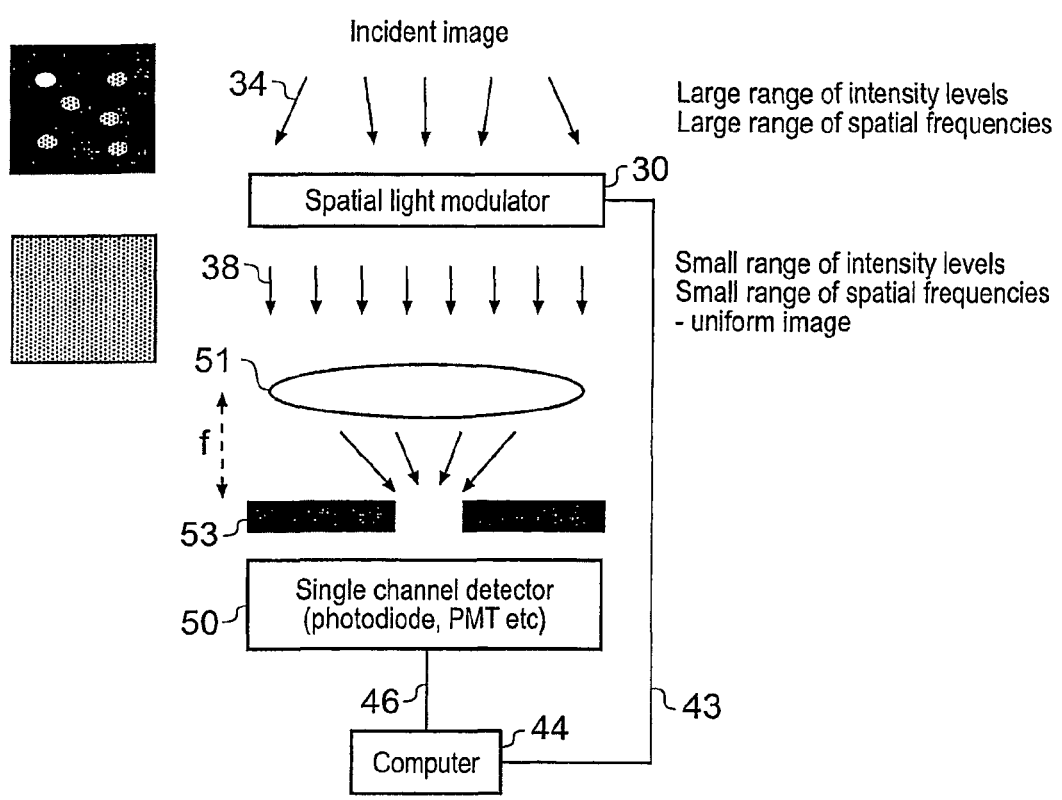
FIG. 8 schematically illustrates an imaging apparatus using a single channel detector located behind an aperture in a Fourier plane of the modulated light image.

The example embodiment of FIG. 8 uses one or more single channel detectors 50 to record the signal output from the SLM 30 and provide appropriate feedback to achieve a quasi-uniform detected intensity as the SLM 30 selectively passes the light corresponding to individual pixels one after another in a sequence. Thus one can achieve coherent light imaging with a single or few channel detector 50. This permits imaging with exotic single or few channel detectors 50 in situations where there is no available wide-field imaging detector. Note that the incident image 34 is assumed to be coherent. Generation of the coherent image can be a natural result of the imaging system used or an incoherent image can be converted to a coherent one by using an optically addressed spatial light modulator or a photo-refractive device.

The single channel detector 50 may be a detector located after a spatial filter through which a plane wave (quasi-uniform image) would be coupled most efficiently. This could be, for example, an optical fibre coupled detector. The spatial filter is simply a lens 51 with an aperture (pinhole) 53 in the focal (Fourier) plane. A second detector may be used to detect the light rejected by the pinhole to provide a second signal which may be used in comparison with the first signal (collected through the pinhole) to give a better measure of the uniformity of the modulated image that is independent of the total attenuation of the spatial light modulator.

Figure 9:
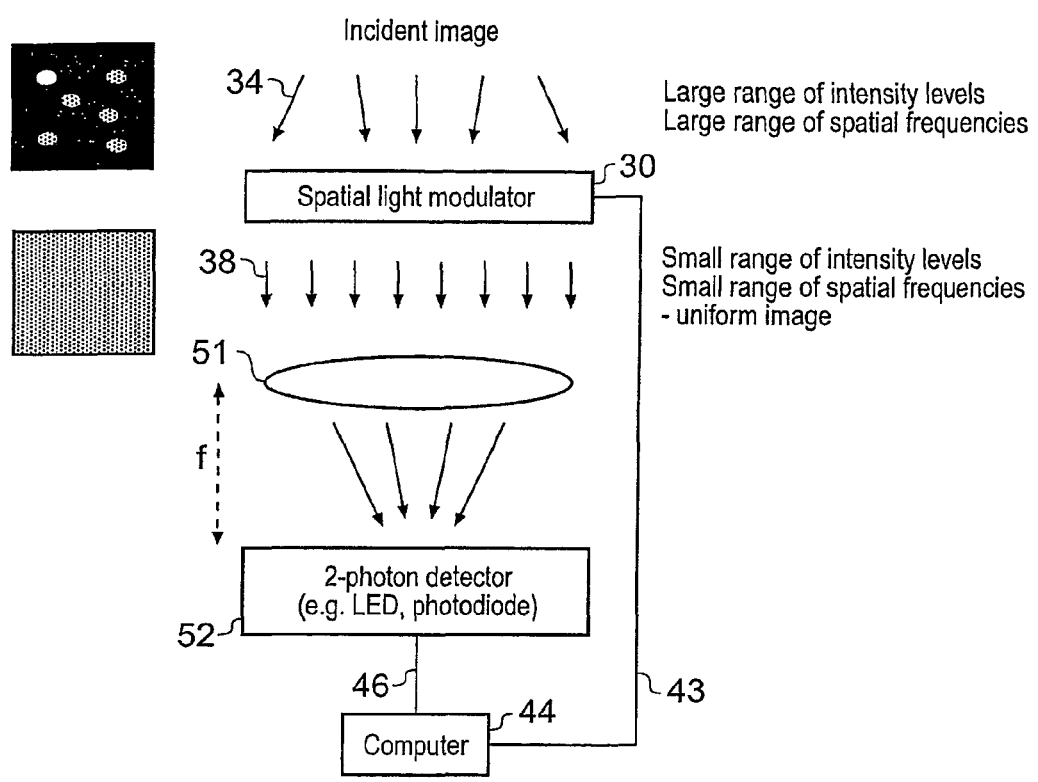
FIG. 9 schematically illustrates an imaging apparatus using a two-photon detector in a Fourier plane of the modulated light image.

Alternatively, the modulated light 38 could be focused through the lens 51 onto a 2-photon detector 52 in the Fourier plane, as illustrated in FIG. 9. The output of a 2-photon detector 52 is a nonlinear function of the incident intensity and so this would give a maximum signal when an incident image is a plane wave or a uniform image. Such an approach has been used to provide an effective "pinhole detector" in a confocal microscope experiment (for example, see "Transmission confocal laser scanning microscopy with a virtual pinhole based on nonlinear detection," C. Yang and J. Mertz, OPTICS LETTERS/Vol. 28 (2003) 224-6).

This approach also has the useful feature that the detector would be sensitive to half the incident radiation wavelength. Thus it could be used, for example, for near-mid-infrared imaging applications.

The main application of the example embodiments of FIGS. 8 and 9 would be to achieve full-field imaging using a single channel detector or 2-photon detector in situations where there are no appropriate imaging detectors available, or where they are very expensive or not very sensitive. One application would be mid-infrared imaging (longer than 18 μm) for which there are very few detectors available, those detectors that do exist tending to be very expensive.

In the case where no imaging detector is available, the two-photon detector may permit the use of appropriate detectors at half the wavelength.

One could also use a nonlinear sum-frequency generation scheme in which a power local oscillator is mixed with incoming radiation to generate a detectable signal. It would be much easier to implement this in a single channel detector that in an imaging detector.

The invention claimed is:

1. An imaging apparatus comprising:
   a spatial light modulator configured to receive coherent incident light representing an incident light image, to modulate said incident light to form spatially modulated light, and to attenuate said coherent incident light, wherein the image apparatus is configured to determine an intensity for a portion of said coherent incident light that comprises a detected intensity value and an attenuation value corresponding to said portion of said coherent incident light; and
   an image capture device located in a Fourier plane of said spatially modulated light and configured to receive and capture said spatially modulated light, the image capture device comprising at least one detector configured to sample the spatially modulated light and detect the intensity value; wherein feedback is sent to said spatial light modulator to cause said spatial light modulator to form, using one or more attenuation values and on a pixel by pixel basis, a uniform output image comprising spatially modulated light with a maximum uniform intensity distribution.

2. The imaging apparatus as claimed in claim 1, wherein said spatial light modulator is configured to reduce a dynamic range of intensity values of said spatially modulated light.

3. The imaging apparatus as claimed in claim 1, wherein said spatial light modulator is configured to match a dynamic range of intensity values of said spatially modulated light with a dynamic range of said image capture device.

4. The imaging apparatus as claimed in claim 1, further comprising a feedback controller configured to receive said intensity value and provide to said spatial light modulator an adjusted attenuation value determined as a function of the spatially modulated light.

5. The imaging apparatus as claimed claim 1, wherein said image capture device comprises a CCD array.

6. The imaging apparatus as claimed in claim 1, wherein said image capture device is a single or few channel detector and said light modulator selects a portion of said incident light to be detected.

7. The imaging apparatus as claimed in claim 6, wherein said single channel detector is one of:
   a photodiode; or
   a photo multiplier tube.

8. The imaging apparatus as claimed in claim 1, wherein said image capture device is a two photon detector and said spatial light modulator is configured to select a portion of said incident light to be detected.

9. A method of imaging comprising:
   receiving coherent incident light representing an incident light image;
   detecting an intensity value of the coherent incident light;
   modulating said coherent incident light to form spatially modulated light such that an intensity value for a portion of said incident light comprises the detected intensity value and an attenuation value corresponding to said portion of said incident light;
   sampling the spatially modulated light;
   based on the sampled spatially modulated light, generating a uniform output image comprising spatially modulated light with a maximum uniform intensity distribution on a pixel by pixel basis; and
   capturing said spatially modulated light using an image capture device located in a Fourier plane of the spatially modulated light.

10. The method of imaging as claimed in claim 9, wherein said modulating is performed by a spatial light modulator.

11. The method of imaging as claimed in claim 9, wherein said modulating is controlled so as to reduce a dynamic range of intensity values of said spatially modulated light.

12. The method of imaging as claimed in claim 9, wherein said modulating is controlled so as to match a dynamic range of intensity values of said modulated light with a dynamic range associated with said capturing said spatially modulated light.

13. The method of imaging as claimed claim 9, further comprising providing an adjusted attenuation value determined as a function of the spatially modulated light.

14. The method of imaging as claimed in claim 9, wherein said capturing said spatially modulated light is performed by a CCD array.

15. The method of imaging as claimed in claim 9, wherein said capturing said spatially modulated light is performed by a single or few channel detector and said modulating comprises selecting a portion of said incident light to be detected.

16. The method of imaging as claimed in claim 15, wherein said single channel detector is one of:
   a photodiode; or
   a photo multiplier tube.

17. The method of imaging as claimed in claim 9, wherein said capturing said modulated light is performed by a two photon detector and said modulating comprises selecting a portion of said incident light to be detected.

18. The imaging apparatus as claimed in claim 1, wherein said image capture device is further configured to determine a plurality of intensity values corresponding to said spatially modulated light such that a modulated light image can be rendered from said spatially modulated light.

19. The method of imaging as claimed in claim 9, further comprising determining a plurality of intensity values corresponding to said spatially modulated light such that a modulated light image can be rendered from said spatially modulated light.

* * * * *